HARMONIC COMMUNICATION AND NAVIGATION SYSTEM

Filed Dec. 12, 1966

4 Sheets-Sheet 1

INVENTORS
Harry A. Augenblick
John G. Vogler
BY Irving Seidman
ATTORNEY

June 30, 1970 H. A. AUGENBLICK ET AL 3,518,546

HARMONIC COMMUNICATION AND NAVIGATION SYSTEM

Filed Dec. 12, 1966 4 Sheets-Sheet 2

HARMONIC COMMUNICATION AND NAVIGATION SYSTEM

Filed Dec. 12, 1966 4 Sheets-Sheet 3

United States Patent Office 3,518,546
Patented June 30, 1970

3,518,546

HARMONIC COMMUNICATION AND NAVIGATION SYSTEM

Harry A. Augenblick, Mountain Lakes, and John G. Vogler, Convent Station, N.J., assignors to Microlab/FXR, Livingston, N.J., a corporation of New Jersey Filed Dec. 12, 1966, Ser. No. 600,894
Int. Cl. H04b *7/14, 1/38, 1/50*
U.S. Cl. 325—8 15 Claims

ABSTRACT OF THE DISCLOSURE

A harmonic communication and navigation system that includes one or more non-linear elements, and a carefully shielded and filtered transmitter and receiver to permit detection of the harmonics generated by the non-linear elements. A sampled transmitter and heterodyned receiver makes the system insensitive to frequency shift and a plurality of non-linear elements are arranged so as to produce maximum reradiated harmonic field intensity in the exact direction from which the fundamental frequency arrived. The harmonics generated by the non-linear elements are modulated to permit transmittal of fixed and variable information from said elements to the receiver.

BACKGROUND OF THE INVENTION

Field of the invention

This invention relates to a communication and navigation system for detecting the presence, absence, or movement of elements having non-linear electrical characteristics which cause harmonics of a transmitted signal to be generated, and to interrogate said elements for information by the application of electrical bias modulation thereto. The invention has particular application in aircraft navigation systems and the like.

Description of the prior art

Harmonic generators normally make use of the non-linear properties of active elements such as tubes, transistors, diodes and the like to produce harmonics of the signal of fundamental frequency applied to the particular device. For example, these elements are made to operate on the non-linear portions of their characteristic curve so that the resulting output signal is a distorted wave of the input signal wave form in which most harmonics of the input signal frequency are present. By appropriate filtering techniques, a single harmonic or a plurality of harmonics may be extracted from the distorted output wave form in accordance with the particular requirement of the external circuitry.

Conventionally, energy is applied to and removed from such non-linear elements or devices by means of physical conductors such as wave guides, coaxial cables, or wires. However, a serious problem has been encountered in attempting to radiate energy to and receive harmonic frequency radiations from such devices, particularly in those applications in which the harmonic generated by the non-linear element is utilized to detect the presence or absence of the element.

More particularly, the transmitter circuitry usually creates harmonic signals which are transmitted along with the signal of fundamental frequency. Additionally, the receiver circuitry is usually a generator of harmonic signals. Hence, the harmonic signal as generated by the transmitter and the receiver completely mask the signals generated by the non-linear element so that the system continuously produces erroneous indications of the presence of the harmonic-generating non-linear device. To compound the problem even further, the harmonic signal radiated by the non-linear device has a low amplitude so that it is lost in the random signals received by and generated within the receiver.

The above problems may be eliminated by utilizing proper shielding and filtering in the transmitter and receiver. However, the filters, of necessity, would have to have extremely deep and thus steep stop band characteristics in order to make the transmitter and receiver sensitive to the harmonic signals generated by the non-linear element. Accordingly, a small frequency drift of the transmitted frequency may very well cause the received harmonic signal to fall outside of the pass bands of the receiver filters. Thus, this information signal would be attenuated and again the system would produce erroneous results.

The present invention eliminates the above problems and finds application in navigation systems.

Conventional radar techniques permit locking on to any passive target provided such target is isolated from other nearby targets, i.e., an airplane in space. Such conventional radar has difficulty in locking onto an object surrounded by background clutter. Furthermore, conventional radar techniques measure distance from the operator to the target by measuring the transmit time for a pulse to leave the transmitter, travel to and from the target, and be detected by the receiver. Such devices employ the finite speed of light or microwaves as the basis of distance measurement. These measurements are limited as to minimum measurable distance by the fact that the transmitted pulses have a finite width and the further limitation that the delicate receiver must not be turned on until the transmitter has been fully turned off. The present invention overcomes this minimum distance limitation and also permits the use of broader, less expensive pulsing equipment by not requiring that the transmitter be turned off prior to the turning on of the receiver. This permits measurements down to zero distance and permits the elimination of TR tubes, extremely rapid pulse circuitry and other expensive components, and thus permits a reduction in the cost and complexity of distance measuring equipment.

Accordingly, an object of the present invention is to provide a communication and navigation system utilizing energy radiated from a harmonic generator which is insensitive to frequency drift.

Another object and feature of the present invention resides in the novel details of the circuitry which provides a system wherein the relative movement of the harmonic generator with respect to the transmitter and/or receiver may be easily detected.

Another object of the present invention is to detect and interrogate a diode harmonic target for information by providing a communication and navigation system far superior than the conventional radar techniques now in operation.

SUMMARY OF THE INVENTION

The harmonic communication and navigation system of the present invention includes a transmitter which radiates a signal of fundamental frequency to a harmonic generator in the form of an element having non-linear electrical characteristics. A receiver is provided to receive the harmonic signal generated by the non-linear element and to detect same, particularly by heterodyning the harmonic signal to an intermediate frequency which is detected by appropriate means to indicate the presence of the non-linear device. Filters having steep stop band characteristics are provided to increase the sensitivity of the receiver to the signal of harmonic frequency.

In accordance with a feature of the present invention, the harmonic generator takes the form of a single diode antenna or a phased array of diode antennas which are applied to or embedded within a target under surveillance. Since the diode antennas radiate harmonic frequencies, the passive diode antennas would appear as active devices and be separable from nearby background clutter. In the case of the phased array, uni-directional power flow is assured through the use of filters and diodes so polarized that the harmonic beam retransmitted from this array will have a high field intensity in the direction from which the signal of fundamental frequency arrived. The harmonic signals radiated by the diode array on said target may be modulated by the application of electrical bias such that parameters as identity, altitude, speed, temperature and the like, are readily ascertained from a distance.

In accordance with a further feature of the present invention, both the transmitted signal and the local oscillator signal in the receiver are multiples of a single frequency, such multiples being created by multiplication and/or mixing. The frequency of the local oscillator signal is such that when mixed with the received harmonic signal, a signal of intermediate frequency is created which is applied to a detecting apparatus. Frequency changes in the transmitted signal due, for example, to drift in the oscillator of the transmitter will automatically be compensated for since a portion of the transmitted signal is utilized to produce the local oscillator signal in the receiver. Accordingly, the device of the present invention will be insensitive to frequency changes in the transmitter.

Furthermore, by mixing the signal of intermediate frequency of the receiver with another sample of the transmitted signal or one of its sub-harmonics, a Doppler relative speed measuring system is obtained.

Furthermore, by combining the signal of intermediate frequency of the receiver with another sample of the transmitted signal or one of its sub-harmonics in a phase comparison network, a system is obtained which will measure the rate of closure or rate of change of relative speed with respect to said target.

Furthermore, by pulse modulating the transmitted signal and measuring the time delay of the received harmonic signal with respect to the transmitted signal, a system is obtained which will measure distance down to a zero value.

Furthermore, by frequency or phase modulation of the transmitted signal and using a frequency or phase comparison network to compare the instantaneous transmitted and received signals, a system is further obtained which will measure distance down to a zero value and/or which will limit the distance at which the receiver can detect the presence of said target.

The above and other features and advantages of the present invention will become more apparent from the consideration of the following detailed description when taken in conjunction with the accompanying drawings, in which.

Figure 2:
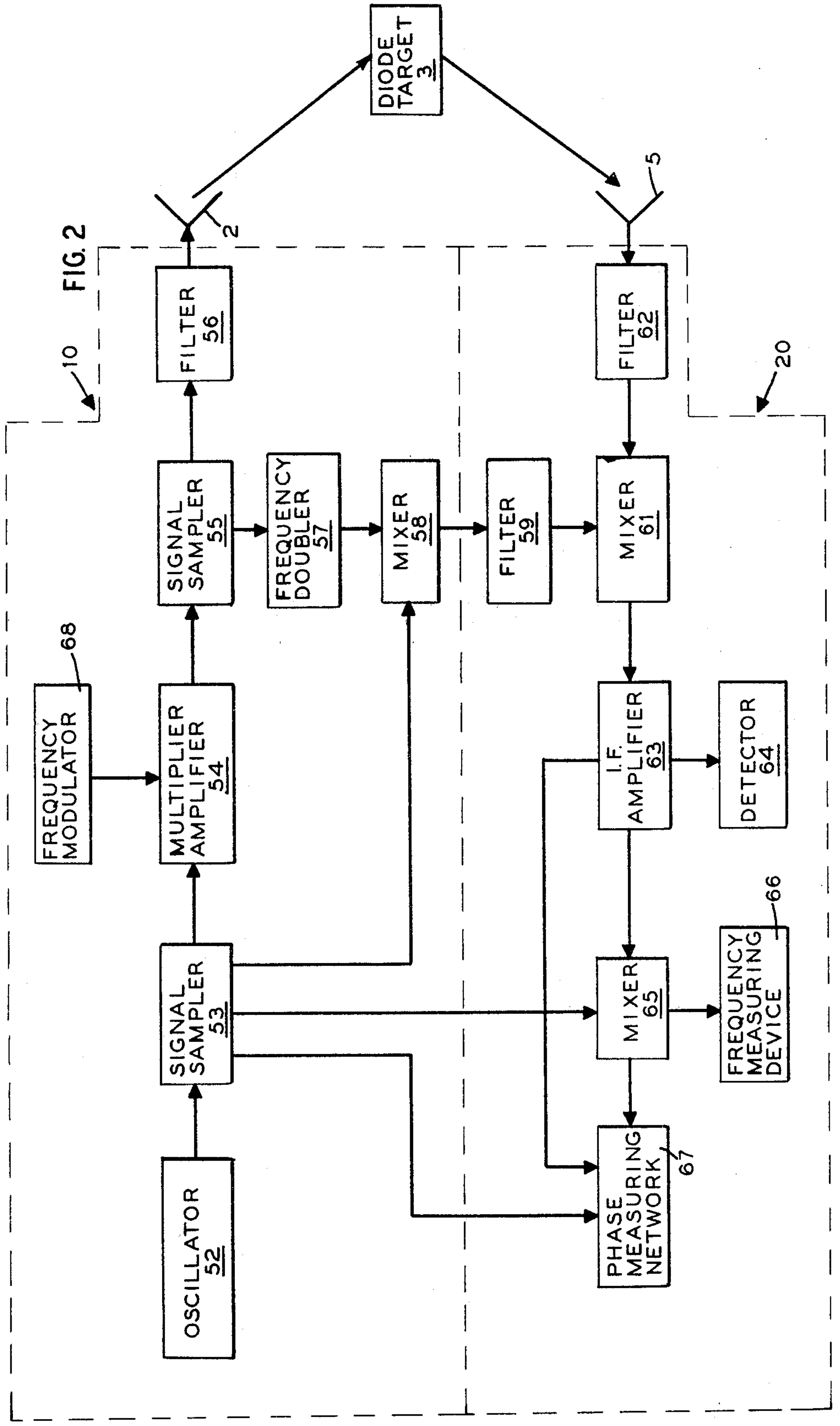
FIG. 2 is a block diagram of the transmitter and receiver units shown in FIG. 1.
Figure 4:
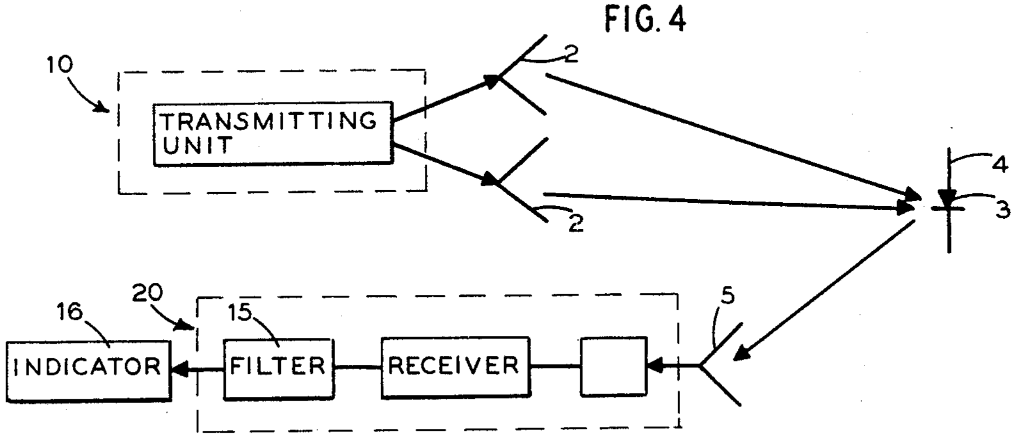

FIGS. *3a–3e* diagrammatically illustrate antennas which may be used in conjunction with the system shown in FIG. 2;

FIG. 4 is a block diagram of a system utilizing the apparatus of the present invention, in which the presence of a moving diode may be detected.

Figure 6:
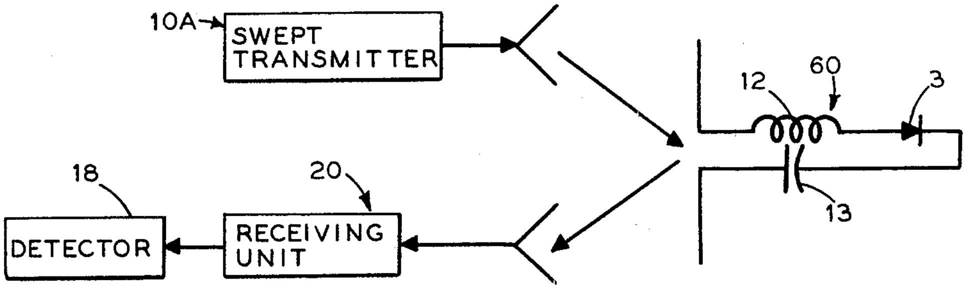
Figure 7:
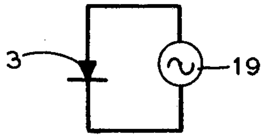
Figure 8:
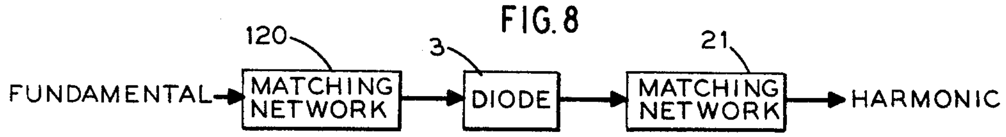
Figure 9:
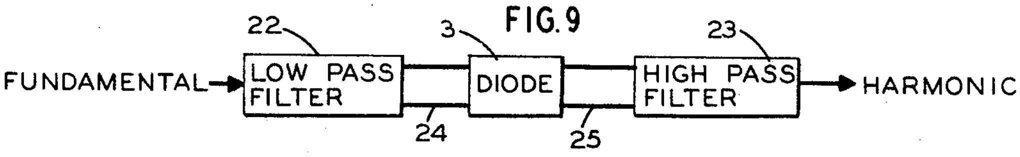
Figure 10B:
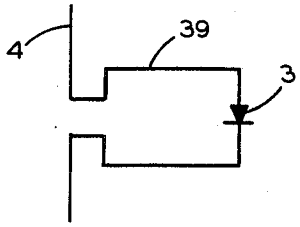
Figure 10A:
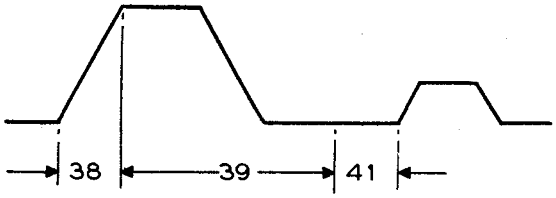
Figure 11:
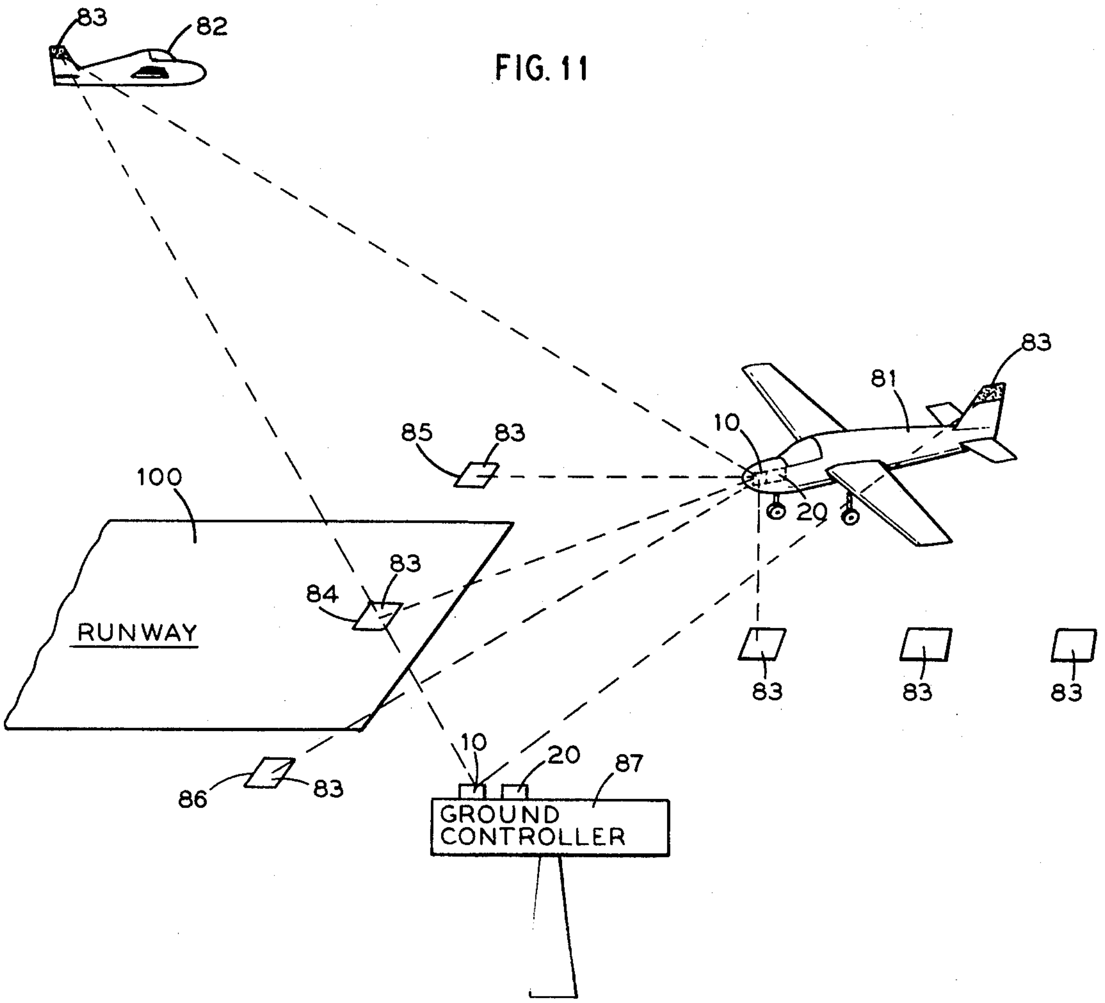

FIGS. *5a* and *5b* illustrate a system in block diagram form which may alter the signals generated by the harmonic generator so that different generators may be identified by their unique signals;

Fig 6 illustrates a modified embodiment of a system which alters the response of the harmonic generator;

FIG. 7 is a schematic diagram of a harmonic generator with a bias applied thereto to alter its response;

FIGS. 8 and 9 illustrate, in block diagram form, devices which may be incorporated into the system of FIG. 2 to increase the efficiency thereof;

FIGS. 10*a* and 10*b*, respectively, illustrate waveforms produced by a harmonic generator incorporating a preselected amount of time delay and a schematic diagram of the circuit; and FIG. 11 diagrammatically illustrates the application of the present invention to an aircraft communication and navigation system.

DESCRIPTION OF THE PREFERRED EMBODIMENTS

As noted hereinabove, the present invention includes an electrical element having a non-linear characteristic curve. While a number of elements have this property, the present invention will be described in conjunction with a semi-conducting diode. However, this is not to be interpreted as being a limitation on the present invention since any device which generates signals from a signal of fundamental frequency may be utilized. Additionally, certain specific frequencies of operation will be specified hereinbelow. However, it is again emphasized that these ranges of frequencies are for illustrative purposes only and the invention is not to be interpreted as being limited to operation in these particular ranges.

Figure 1:
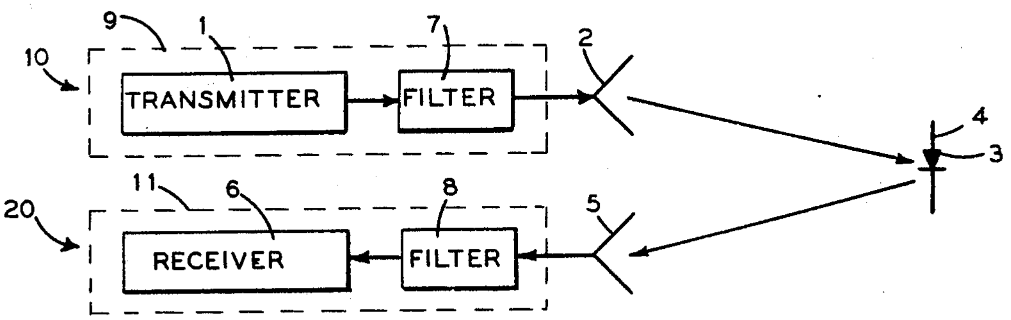
FIG. 1 is a diagrammatic view, partially in block form, of a system constructed in accordance with the present invention.

Referring to the drawings, FIG. 1 diagrammatically illustrates a system constructed in accordance with the present invention. Accordingly, there is provided a transmitting unit 10 which includes a transmitter 1 which generates electromagnetic signals of frequency NF, N being a whole integer, and applies the same to a transmitting antenna 2. A device, such as a diode 3, which has non-linear electrical characteristics is positioned in the path of signals radiated from the antenna 2. Electrical conductors 4 are connected to the respective cathode and anode terminals of the diode 3 and provide antennas which receive energy from the radiated signals, apply the same to the diode 3, and reradiate the same back to a receiving unit 20. The conductors 4 may be made integral with the diode 3.

Because of the inherent non-linear characteristics of the diode 3, the output signal produced by the diode will be a distorted waveform of the input signal of fundamental frequency NF. Accordingly, the output signal will contain a number of the harmonics of the input signal. For example, the second harmonic output signal of the diode 3 will have a frequency 2NF. The receiving unit 20 includes a receiving antenna 5 which is positioned at a point remote from the diode 3. The antenna 5 receives the harmonic signals generated by the diode 3 and applies the same to a receiver 6 which detects the presence of these harmonic signals and indicates the same by appropriate means, as disclosed in detail hereinbelow.

Because the second harmonic generally has the highest amplitude of all the harmonics generated by the diode 3, the receiver 6 is usually tuned to this particular harmonic. However, it will be appreciated that the system of the present invention can be designated to receive other harmonics generated by the diode.

It should be noted that the transmitter 1 and receiver 6 normally includes elements having non-linear characteristics and, therefore, the transmitter or the receiver may also be a generator of second harmonic signals. Accordingly, it is necessary to design the transmitter and the receiver and their associated circuitry in such a manner that they do not generate or radiate second harmonic signals. For example, if the transmitter did generate second harmonic signals, the signals may reach the receiver 6 where the would be detected without a non-linear harmonic generator element being present in the environment. Thus, the objectives of the system would be defeated. The suppression or elimination of harmonics, particularly the second harmonic, from the energy radiated by the transmitting antenna 2 is of critical importance to the operation of the present system.

Similar comments apply to the receiver which must receive and detect second harmonic signals generated by the non-linear element located in the range of the transmitting antenna. The receiver must be sufficiently selective so that it does not respond to signals other than the second harmonic, and in particular it must not respond to the signal of fundamental frequency radiated from the transmitter which generally will be present with greater field intensity than the second harmonic generated by the non-linear element. This problem is compounded even further in view of the fact that the receiver contains elements having non-linear electrical characteristics such as mixer or detector diodes, transistors or vacuum tubes in their circuitry. Thus, any fundamental generated by the transmitter which reaches these components may generate harmonics and as a result, mask any second harmonic signals arriving through the receiving antenna 5 from the diode 3. The exclusion of signals of fundamental frequency from the receiver circuitry is, therefore, a further critical design consideration.

The suppression or elimination of particular harmonics from the signals radiated by the transmitting antenna 2, and the exclusion of signals of fundamental frequency from the receiver circuitry is achieved by proper filtering and shielding techniques in both the transmitting unit 10 and the receiving unit 20. Accordingly, filters 7 and 8, respectively tuned to the signal of fundamental frequency and the second harmonic signal are respectively provided between the transmitting antenna 2 and the transmitter 1 and the receiving antenna 5 and the receiver 6. The dotted lines 9 and 11 represent shielding which surrounds the transmitting unit 10 and the receiving unit 20 to isolate the same from interfering signals.

The filter 8 in the receiving unit 20 must, of necessity, have steep stop band characteristics so that the receiver will be sensitive only to the second harmonic signal generated by the harmonic geneartor which, in the present application, is the diode 3. Accordingly, if there is a slight frequency drift in the carrier signal generated by the transmitting unit 10, the harmonic signal generated by the diode 3 may fall outside of the pass-band of the filter 8. Accordingly, the receiver 6 will produce a signal which would indicate that no diode 3 is present within the area surveyed by the transmitting antenna 2. In order to eliminate such erroneous results, a transmitter-receiver of the type shown in FIG. 2 is utilized.

Accordingly, the transmitting unit 10 includes an oscillator 52 which produces a signal of fundamental frequency F. The signal generated by the oscillator 52 passes through a signal sampling circuit 53 and is applied to frequency multiplier-amplifier 54 where it is multiplied to become transmitting frequency NF, N being a whole integer, and amplified to the desired signal power. The output of the multiplier-amplifier 54 passes through a second signal sampling circuit 55 and a steep stop band filter 56 which passes said frequency NF and attenuates all other signals which may be generated in the circuitry preceding the filter 56. The output of said filter is connected to a transmitting antenna 2 which radiates the transmitted signal over the particular area which is to be probed. The second signal sampler 55 is adapted to apply a portion of the signal of frequency NF produced in the multiplier-amplifier 54 to frequency doubling circuit 57, which produces frequency 2NF. It is to be noted that if the receiving unit 20 is tuned to a harmonic other than the second harmonic of the signal of fundamental frequency, then the appropriate frequency multiplier will be utilized instead of the frequency doubler 57. For example, if the receiver is tuned to the fourth harmonic of the transmitted signal, then a circuit which multiplies the transmitted signal by a factor of four would be used in place of the frequency doubler. The output of the frequency doubler 57, of frequency 2NF, is applied to a mixer 58. Also connected to the mixer 58 is the output of said first mentioned signal sampling circuit 53 of frequency F. Accordingly, signals of frequency (2N plus 1) times F and (2N minus 1) times F appear at the output of mixer 58. The output of the mixer 58 is connected to the input of filter 59, which filter passes either one of said last mentioned signals and which attenuates all other frequency signals that may be present at its input, particularly frequencies F and 2NF. The output of said filter 59 is applied to a receiver mixer 61. Also connected to the receiver mixer 61 is the output of recevier filter 62, which filter passes the harmonic signal 2NF received by receiving antenna 5 from diode target 3 to said receiver mixer 61, and which filter attenuates all other frequency signals that may be present at its input, particularly frequency NF.

The receiver mixer 61 mixes the signals from filters 59 and 62 and produces a signal of intermediate frequency F which is applied to an intermediate frequency (IF) amplifier 63. The IF amplifier then applies the signal F to the input of the detector 64 which produces an output signal indicating the presence of said diode target. By impressing a bias modulation on diode target 3, in a manner described hereinafter, the detector 64 will reproduce said bias modulation in its output.

The output signal F from the IF amplifier 63 can further be applied to a second receiver mixer 65 where it is combined with another output of said first mentioned signal sampling circuit 53 to produce a signal of zero difference frequency; said signal being applied to frequency measuring device 66. If the diode target 3 is moving with respect to antennas 2 and/or 5, the harmonic signal received by antenna 5 will no longer be of exact frequency 2NF but will be of frequency 2NF plus or minus 2D, which frequency shift 2D is caused by the well known Doppler effect. The output of IF amplifier 63 will now be of frequency F plus or minus 2D and the output of the second receiver mixer 65 will be of frequency 2D. Accordingly, the output frequency of mixer 65 is related to the speed of said moving diode target 3. The frequency measuring device 66 can then be calibrated to measure the speed of said target.

The output signal F from the IF amplifier 63 can further be applied to a phase measuring network 67 where the phase of said signal F is compared to the phase of another signal of frequency F which is obtained from said first mentioned signal sampling circuit 53. The phase of the signal coming from said signal sampling circuit is fixed and is used as a reference. The phase of the signal coming from IF amplifier 63 varies as a function of the signal path length from antenna 2 to the diode target 3, and from the diode target 3 to antenna 5. Accordingly, minute changes in said path length and the rate of change of said path length can be detected by a comparison of the phases of the two signals in said phase measuring network.

The system of FIG. 2 can further be used to measure distance to the diode target 3, whereby it is also possible to limit, to any predetermined value, the distance at which the target can be detected. The output of frequency multiplier-amplifier 54 can be modulated by frequency modulator 68 to cause the frequency of said output to vary linearly with time. The frequency of the output signal from filter 56 will thus also vary linearly with time, but the instantaneous frequency output of said filter 62 will be delayed with respect to the signal from filter 56 as a function of the path length from antenna 2 to diode target 3, and from diode target 3 to antenna 5. As a result, the output frequency of receiver mixer 61 and thus the input frequency to the frequency measuring device 66, will be a function of said path lengths. Accordingly, the frequency measuring device 66 can be calibrated to indicate the distance to said target. By incorporating filter means in said frequency measuring device, it is possible to select only those signals which correspond to a particular distance or range of distances to said target. It is to be noted that in applying the system of FIG. 2 to distance measuring applications, the receiver and transmitter may be operating simultaneously without interfering with or distorting the signal being received from the diode target. It is also noted that no pulsing circuits or T/R devices are required as in conventional radar distance measuring systems wherein the transmitter has to be turned off prior to turning on the receiver. This, in turn, permits measurements down to zero distance.

The system of FIG. 2 can also be applied to conventional radar distance measuring systems employing pulsed transmitting signals. If the transmitted signal were pulsed, either by switching or by modulation, and if the pulse of the transmitted fundamental signal is compared to the pulse of the received harmonic signal in a pulse position indicating device, such as an oscilloscope, the separation between reference points on the transmitted and received pulses will be proportional to the path lengths to and from the diode target. Such distance measurements require no T/R device as are required in conventional radar distance measuring systems wherein the transmitter has to be turned off prior to turning on the receiver. This, in turn, also permits measurements down to zero distance.

While the circuit shown and described in FIG. 2 is a preferred embodiment for multiplication of a single frequency F to assure frequency stability and tracking of the transmittal signal and the local oscillator signal, it will be appreciated that the same results can be obtained by other circuit embodiments of frequency multiplication or by automatic frequency control or phase locking techniques. Furthermore, while certain functions of the above system can be achieved without incorporating therein either the aforementioned phase locking or multiplication techniques, said functions are performed at reduced efficiency.

It is further noted that the circuit shown and described in FIG. 2 employs a superheterodyne receiver. Again, while certain functions of said system can be achieved with other types of receivers, for example, a crystal video receiver or superregenerative receiver, said functions are also performed at reduced efficiency.

It should also be noted that the present invention contemplates appropriate filtering of the power supply connections which drive the circuits illustrated in FIG. 2 to eliminate any harmonics that might be transmitted through said connections. Additionally, as noted hereinabove, appropriate shielding is provided between the circuits to prevent harmonic signals of origin other than the external non-linear elements from reaching and overloading the receiver components. In this connection, in addition to filtering the power supply connections, further filtering is provided for every connection into and out of the respective shielded compartments.

The signal of fundamental frequency radiated by the transmitter antenna 2 must be detected by the non-linear element 3 with reasonable efficiency and the second harmonic generated within the element must be re-radiated with similar efficiency. The conducting leads 4 which are usually a part of the elements can form a receiving and transmitting dipole and antenna provided their dimensions approximate those of an ideal dipole antenna at the particular frequencies under consideration.

The selection of antenna depends on the size and range of the area to be surveyed. Systems sensitivity and range will, of course, be highest when high directivity and high gain antennas which survey only a small sector of an area at any one time are used. To avoid the possibility of cross-polarization of the antenna fields and element dipole, which can occur with linearly polarized antennas and which would prevent pickup of the fundamental by the element dipole, circularly polarized transmitting and receiving antennas may be used.

Figure 3A:
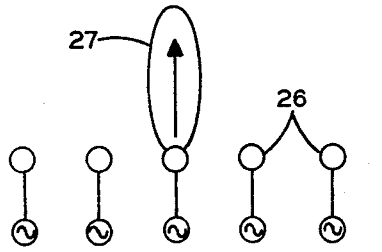
Figure 3B:
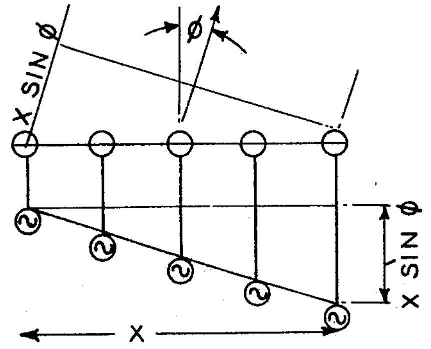
Figure 3C:
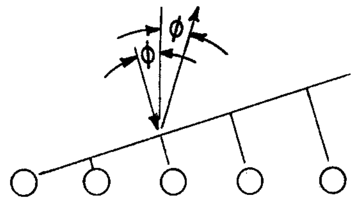

The greater the gain of the antenna associated with an individual diode 3, the greater the gain or range of the diode communication system. This gain means that the voltage induced across the diode 3 may be increased by using antennas that intercept more energy in space or do so in a particular direction. Almost every known antenna system could be employed for this purpose. For example, the diode 3 may be mounted at the center of a dipole, rhombic biconical, discone or similar antenna. Additionally, the diode 3 may be mounted at the junction of an image dipole, conical or similar antenna and the ground plane. Other possibilities are to mount the diode at the end of a long wire antenna or to mount the diode at the focus of a parabolic or corner reflector antenna. As shown in FIG. 3*a*, two or more diode antennas 26, such as described in the preceding paragraph, may be arranged into a phased array wherein a high gain narrow beam 27 of this antenna system is increased in proportion to the number of dipole antennas so connected.

Figure 3D:
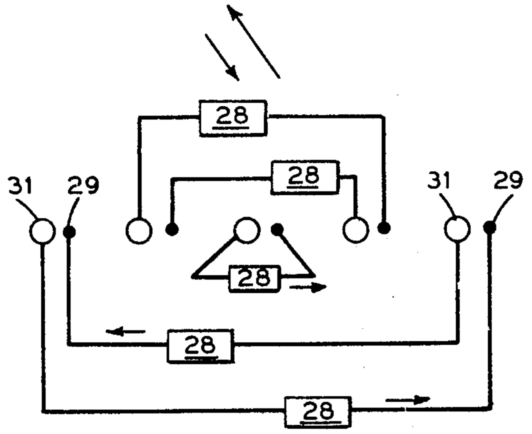

As is well known in the art, a plane wave which strikes a phased array at an angle $\phi$ with respect to a normal to the plane of the array will leave the array at the same angle (i.e., the angle of incidence is equal to the angle of reflection). If the received energy is caused to flow in a single direction through the use of isolators, filters, amplifiers 28 and the like, as shown in FIG. 3*d*, and if the energy so flowing is caused to be re-radiated, and the re-radiating antennas 29 are reversed in position from the receiving antennas 31 and these equal angles are employed, then the energy so received will be radiated back in the exact direction from which it originated. Thus, energy received from the transmitting unit will be directed back to the receiving unit which is located at the same point in space as the transmitting unit. It will be appreciated that by proper positioning of the receiving and re-radiating antennas, the high gain beam which is narrow along its longitudinal axis can, at the same time, be made narrow along an axis transverse to said longitudinal axis, thereby extending to said beam a pencil-like shape.

Figure 3E:
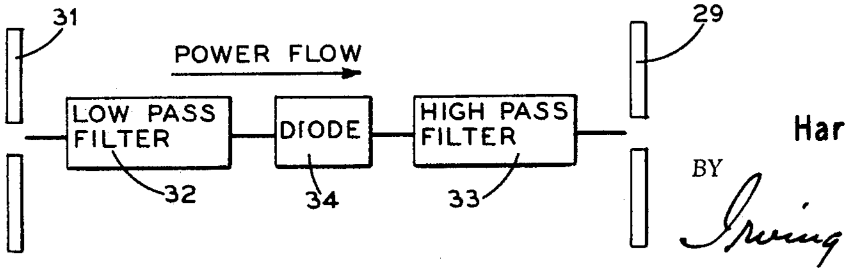

The above principle may be directly applied to an array of diode antennas, as shown in FIG. 3*e*, in which the uni-directional power flow is assured through the use of filters 32 and 33 and diode 34 so polarized so that the harmonic beam retransmitted from this array will return in the exact direction from which the signal of fundamental frequency arrived. Accordingly, this is referred to as a diode cats eye phased array.

FIG. 4 illustrates a system in which the movement of a diode 3 is detected. To be more specific, the harmonic signal received at the receiver is a function of both the field strength created by the transmitter in the vicinity of the diode and of the field strength created by the diode in the vicinity of the receiver. If more than one transmission path is available from the transmitting unit 10 to the diode 3, such as from reflections from nearby objects or from signals from two or more transmitting antennas 2, these multiple signals will combine vectorially at any point in space thereby to create positions of maximum and minimum field strength, or a spatial standing wave. The motion of a diode through this standing wave will create a modulation of the received harmonic signal; that is, the intensity of the received harmonic will vary as the diode is moved from positions of large field strengths to positions of lesser field strength. This varied intensity of modulation of the received harmonic can be noted at the receiving unit or at the output of the detector 64. As an alternative, the output of the receiver can be filtered by a filter 15 so that only the signals generated by moving diodes would be indicated at an appropriate indicating unit 16.

Since the audio modulation frequency generated by a moving diode is proportional to the speed of the diode passing through the standing wave pattern, the use of the band-pass filter 15 will permit the detection of diodes moving only at predetermined rate of speed. Alternatively, one can detect only diodes moving at less or more than at a predetermined speed by using low-pass or high-pass filters, respectively. It is also possible to measure the approximate speed of said moving diode by calibrating the modulation frequency versus the speed.

A serious problem associated with the systems described above is due to the increasing abundance of diodes in society, transistor radios, hearing aids, television sets, rechargeable devices, and the like, which may cause a false indication of the system. This problem can be minimized by varying the diode characteristics making its response different than that of a conventional diode.

Figure 5A:
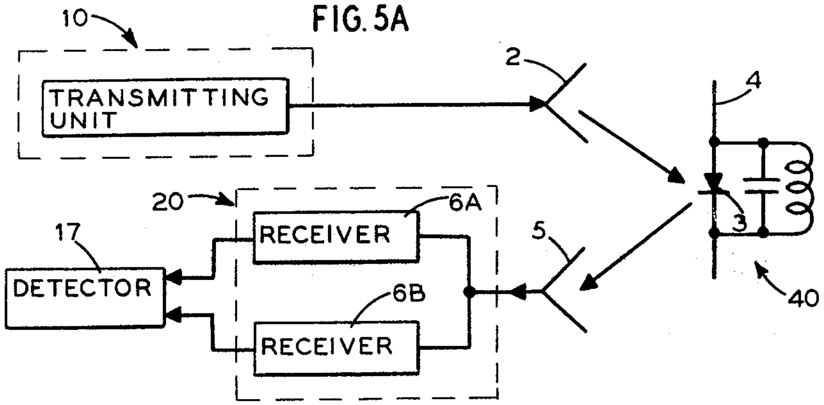

Ordinary diodes will radiate second, third and other harmonics. If a harmonic trap 40, as shown in FIG. 5*a*, is connected to the diode to suppress or eliminate a given harmonic (i.e., the second, for example), while permitting all other harmonics to radiate, the diode would be recognized by its missing harmonic. This system requires receiving units capable of receiving at least two harmonics and would operate as follows:

The transmitting unit 10 would transmit a signal of frequency NF to diode 3 by means of transmitting antenna 2. The harmonics generated by the diode are detected at the receiving unit 20 by means of receiving antenna 5 with the exception of the harmonic 2NF which is attenuated by the harmonic trap 40. The harmonic signals pass through receivers **6*a* and 6*b* which are respectively tuned to the frequencies 2NF and 3NF. The output of the receivers is fed to a detecting device 17 which is activated only when frequency 3NF is noted without the presence of frequency 2NF. In other words, the detector 17** may be in the form of a differential amplifier which produces an output signal only when signal 3NF is received.

Figure 5B:
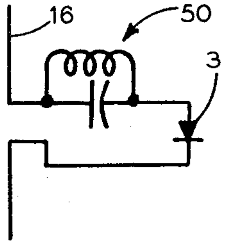

The harmonic suppression noted above in FIG. 5*a* may be accomplished by use of a harmonic filter 50, as shown in FIG. 5*b*. This filter is positioned between a receiving antenna 16 and the diode 3; such filter being tuned to attenuate a particular harmonic while permitting transmission of the fundamental and another harmonic.

FIG. 6 illustrates another system which may be utilized to alter the response of the harmonic generator or diode 3. Accordingly, a tuned circuit 60 comprising a series connected inductor 12 and capacitor 13 receives signals of varying frequencies from a transmitting unit **10*a* which varies the carrier frequency through a preselected range of frequencies. In operation, the diode 3 is connected with the tuned circuit 60 which is adjusted to pass signals having frequencies in the vicinity of the second harmonic of the signal of fundamental frequency and to reject or attenuate signals having frequencies which fall outside the range of the tuned circuit. The harmonic generator thus has a recognizable harmonic response when swept with carrier frequencies; said harmonic response being different from a conventional diode and different from other tuning configurations. The harmonics are re-radiated to a receiving unit 20 and are detected by a detecting unit 18** in the manner indicated above.

The ability to differentiate a plurality of harmonic generators or non-linear elements from one another also enable their use for admission control applications; as in public transportation, theaters, etc. and other such multiple recognition applications.

The efficiency and range of the proposed diode communication and navigation systems are functions of the transmitter power and the amount of a given harmonic that can be generated for a given amount of received fundamental signals. Any particular harmonic may be optimized by the use of filters, phased lines, and the like.

Referring to FIG. 7, the application of a small amount of voltage bias 19 to a diode 3 will affect the point of operation of the diode 3 and therefore will affect the impedance of the the diode in such a way as to change the current flow through the diode and change all harmonic contents.

The efficiency of the communication and navigation system of the present invention will be decreased if there is an impedance mismatch at the input and output of the diode. Accordingly, as shown in FIG. 8, the impedance mismatch may be eliminated by utilizing impedance matching networks 120 and 121 which are respectively connected to the input and output of the diode harmonic generator 3. It is to be noted that the impedance of the diode is a function of the input power level. Thus, impedance matching networks may be utilized so as to maximize the harmonic at the minimum anticipated power level without materially reducing performance at higher power levels.

With reference to the schematic drawing of FIG. 9, low-pass and high-pass filters 22 and 23, respectively, and line stretchers 24, 25 are arranged so that the following results are obtained. Harmonics generated by the diode 3 pass through the high pass filter 23 unattenuated. Harmonics generated by the diode 3 which pass to the left, as taken in FIG. 9, are reflected by low-pass filter back to the diode 3. On the other hand, the fundamental signal passes through the low-pass filter unimpeded but is reflected by the high-pass filter 23. Lines 24 and 25 are of such length as to cause the reflected harmonic fundamental signals to arrive at the diode so that they reinforce signals having the same frequency.

Additionally, simple idler circuits, such as shorted stubs or the like can be added to the circuit of FIG. 9 so as to reflect any higher harmonics with appreciative power content back to the diode for conversion and mixing back into the desired harmonic.

The amplitude of the harmonic signal received by the receiving unit will be a function of the polarization of the diode with respect to the polarization of the transmitting and receiving antennas 2 and 5, respectively. Thus, the change in angle of inclination of a diode can be measured at the receiving unit by noting the attenuation caused by the change in orientation of the diode antenna with respect to the receiving antenna.

As noted hereinabove, the impedance of the diode and, therefore, the harmonic content is a function of the electrical bias on the diode. If this bias is changed periodically, the harmonic signal radiated will be modulated in accordance with the change in bias. Accordingly, the communication and navigation system of the present invention may be utilized for the interrogation of fixed or variable information at the diode by the application of an electrical bias which varies as a function of time. Thus, a particular harmonic generator or diode 3 could be identified through its individual modulation characteristics. Moreover, the harmonic generator can be employed as a transponder or device that, when interrogated, and only when interrogated, transmits information that is modulated onto the harmonic signal generated by the diode.

While a diode has an intrinsic time delay 38, as shown in FIG. 10*a*, under certain conditions it may be desirable to insert a delay line 39 between the antenna 4 and the diode 3, as shown in FIG. 10*b*. Thus, the visual presentation of the transmit and receive pulses in distance measurement is assisted by the inclusion of sufficient time delay such that the transmit pulse is fully off before the harmonic pulse is received, even at very small distances. The measured distance is represented by the character 41. If the transmitted energy is confined to an area of reasonable size, and if the diodes have the equivalent of approximately one mile of time delay, such a diode can be readily distinguished from diodes having other time delays or not having any time delay.

In conventional radar systems speed is determined by the Doppler shift in frequency of the reflected signal. The present detection system may similarly be utilized to detect the speed of an object with greater accuracy than that achieved by conventional radar systems.

To be more specific, in the present system a signal of frequency NF is radiated by the transmitter and is shifted in frequency by a value D due to the movement of the object relative to the transmitter. Accordingly, the frequency of the signal received by the diode 3 will be equal to $NF+$ or $-D$, depending upon the direction of relative movement toward or away from the transmitter. The harmonic generated by the diode will therefore be equal to $2NF+$ or $-2D$. Thus, the present system provide twice the absolute frequency shift as does the conventional radar system, thus increasing the accuracy of the measurement or, to put this in another way, reducing the system cost for a given accuracy.

The range of the present detection system can be increased by incorporating amplifiers between the diode and the diode antenna on both the input and output sides of the diode.

The apparatus of the present invention may be utilized in connection with aircraft radar communication and navigation systems for the interrogation of aircraft identification and barometric altitude, and measuring the distance and rate of closure between aircraft. Referring to FIG. 11, the interrogating plane 81 would require the transmitting and receiving units 10, 20 of FIG. 2, while the other plane 82 would require a diode cats eye phased array 83 incorporating bias modulation. These units would operate in the manner previously disclosed and could perform all existing air to air radar functions at no material increase in cost, while providing automatic interrogation of identity, barometric altitude, etc., of all nearby planes without further air-space congestion. As previously noted, this invention makes it possible to measure the separation between planes to closer distances than presently are being measured by conventional equipment. Automatic compensation means can also be incorporated to insure against mid-air collisions.

For air-to-ground navigation systems, diode cats eye phased arrays 83 having bias modulation would be located along frequently traveled paths such that each array would have identification bias. Such arrays would inexpensively assure the pilot that he is on course and provide him with a check-point of his course as he passed over each array marker. Instrument landing systems could further be provided wherein diode cats eye phased arrays having identification bias modulation could be located at the runway touchdown point 84, on either side of the runway 85, 86 and along the glide path. The rate of closure between the plane 81 and runway 100 would thus be accurately measured and the distance from said runway would be obtained by measuring the pulse transit time. The height and positions on the glide path would be noted with arrays positioned along said path. The exact course could further be maintained by keeping the rate of closure between the plane and the respective arrays on either side of the runway equal.

In ground to air applications, the plane would have a diode cats eye phased array 83 incorporating bias modulation and the ground control 87 would require the transmitted-receiving units 10, 20 of FIG. 2. The ground control would establish automatic identification of each plane and automatically monitor its barometric altitude through the biased phased arrays. This will be of great assistance to present ground monitoring techniques. For example, one ground controller could be assigned to monitor planes at a given height and his scope would only indicate planes in his area of coverage. He could thus automatically identify and warn any given plane of other traffic in the same area. In regard to ground controlled landings, all existing ground control functions could be performed with the above system and in addition, a more accurate measure of plane distance and rate of closure would be obtained.

In addition to the above applications, ground-to-ground applications can include police surveillance systems. Each car would be equipped with a cats eye phased array having bias modulation wherein the bias would indicate vehicle registration number, operator number, car speed, etc. The car would then be interrogated by police using transmitter-receiver units to determine, among other things, stolen vehicles, improper operators, vehicle inspection dates and speeding or other violations. Interrogation could be assisted by installing a filter in front of each receiver that would be tuned to an audio frequency corresponding to the vehicle description; i.e., a code for year of car, make, color, etc. This code could then be selected by the police so as to single out, for example, a 1965 red Dodge by modulating this code onto the transmitted signal. Furthermore, if a diode antenna were placed on each hubcap, the speed of the car could be determined by detecting the modulation of the harmonic caused by tire rotation.

Other automotive applications find use in automatic steering systems. In addition, information on permanent or temporary signs having diode cats eye phased arrays incorporating bias modulation could warn the driver of an automobile equipped with the transmitter-receiver. It will also be appreciated that the rate of closure and distance to the automobile in front could be measured if the lead automobile had diode phased array license plates and the other automobile were equipped with the transmitter-receiver.

With regard to nautical applications, anti-collision systems could be provided as in airborne applications. In air-sea rescue operations, lifeboats and life preservers equipped with diole cats eye phased arrays would be readily located, even at night and in rough seas.

While specific embodiments of the invention have been shown and described in detail to illustrate the application of the principles of the invention, it will be readily understood and appreciated that various changes or modifications thereof may be made without departing from the spirit or scope of the invention as set forth in the appended claims.

What is claimed is:

1. In a communication and detection system for transmitting and receiving a signal derived from said transmitted signal; transmitting means for producing a signal having a preselected frequency; radiating means connected to said transmitting means for radiating said signal of preselected frequency; harmonic generating means for receiving said signal of preselected frequency and for producing the harmonic of said signal and re-radiating and focusing said harmonic signal in substantially the exact direction from which the signal of preselected frequency arrived; receiving means for receiving harmonic signals from said harmonic generating means; filtering and shielding means cooperating with said transmitting and receiving means to make the receiving means sensitive only to the signals re-radiated by said harmonic generating means; circuitry means cooperating with said transmitting and receiving means to compensate for frequency drift in said signal of preselected frequency; said circuit means including frequency changing means connected to said transmitting means and being responsive to said transmitted signal of preselected frequency to produce a reference signal which differs from said harmonic signals by a fixed predetermined frequency; a mixing means connected with said receiving means and said frequency changing means for producing a signal of said preselected frequency; and detecting means cooperating with said receiving means for producing an output signal in response to said harmonic signals.

2. In a detection system as in claim 1, in which said harmonic generating means comprises a diode phased array wherein each diode thereof is connected between separate receiving and transmitting antennas, each pair of said transmitting and receiving antennas being arranged and interconnected with means to insure uni-directional power flow.

3. In a detection system as in claim 2, and biasing means for biasing at least one diode in said diode phased array to operate said biased diode at a predetermined point on its characteristic curve to change the impedance thereof.

4. In a communication and detection system for transmitting and receiving a signal derived from said transmitted signal; a transmitter including a signal generating means for producing a signal of preselected frequency; and radiating means connected to said signal generating means for radiating said signal of preselected frequency; harmonic generating means for receiving said signal of preselected frequency and for producing and re-radiating the harmonic signals of said signal of preselected frequency; a receiver including receiving means for receiving harmonic signals from said harmonic generating means; detecting means for producing an output signal in response to the application of an intermediate frequency signal thereto; and intermediate frequency means intermediate said receiving means and said detecting means for producing an intermediate frequency signal in response to the reception of said harmonic signal; said intermediate frequency means including multiplying means connected to said signal generating means for receiving said transmitted signal and producing a signal equal in frequency to said harmonic signal, an intermediate frequency signal generator, first mixing means connected to said multiplying means and said intermediate frequency signal generator for producing a reference signal which always differs from the frequency of said harmonic signal by said intermediate frequency, and second mixing means connected to said first mixing means and between said receiving means and said detecting means for mixing said harmonic signal with said reference signal to produce said intermediate frequency signal, whereby the frequency of the signal applied to said detecting means is always equal to said intermediate frequency regardless of frequency variation in the signal generated by said signal generating means.

5. In a communication and detection system according to claim 4, in which said harmonic generating means comprises a diode connected between a receiving and transmitting antenna.

6. In a communication and detection system as in claim 4, in which said signal generating means includes second multiplying means connected to said intermediate frequency signal generator for multiplying said intermediate frequency signal to produce said signal of preselected frequency.

7. In a communication and detection system as in claim 6, and third mixing means connected to said second mixing means and said intermediate frequency signal generator for producing an output signal proportional to the difference in frequency between the signals produced by said second mixing means and said intermediate frequency signal generator, and frequency measuring means connected to said third mixing means for measuring said output signal.

8. In a communication and detection system as in claim 7, and frequency modulating means connected between said intermediate frequency signal generator and said radiating means to vary the frequency of the signal produced by said signal generating means about said preselected frequency.

9. In a communication and detection system as in claim 4, and phase measuring means connected between said second mixing means and said intermediate frequency signal generator for producing a signal proportional to the phase difference between the signals produced by said second mixing means and said intermediate frequency signal generator.

10. In a detection system as in claim 4, and a filter connected to said harmonic generating means for attenuating all signals except a preselected one of said harmonic signals.

11. In a detection system as in claim 5, and biasing means for biasing said diode to operate at a predetermined point on its characteristic curve to change the impedance of said diode.

12. In a detection system as in claim 11, in which said biasing means comprises a source of varying potential to modulate the harmonic signals generated by said diode.

13. The method of detecting the presence of a harmonic generator comprising producing a signal of preselected frequency and radiating the same through space to a harmonic generator, producing harmonic signals of the signal of preselected frequency at said harmonic generator, focusing said harmonic signal to have a high field intensity in the direction from which the signals of preselected frequencies came, re-radiating said harmonic signals from said harmonic generator to a receiver, producing a reference signal from said preselected frequency signal which differs from one of said harmonic signals by a fixed intermediate frequency, mixing said reference signal with said one of said harmonic signals to obtain said fixed intermediate frequency signal, and detecting said intermediate frequency signal at said receiver.

14. The method of claim 13, comprising the further steps of modulating the signal of preselected frequency, and comparing the received signal with the modulated transmitted signal to detect frequency differences therebetween.

15. The method of claim 13 comprising the further steps of transmitting said signal of preselected frequency over a plurality of different transmission paths to establish standing waves in space, and moving said harmonic generator through said standing waves to modulate the harmonic signals generated by said harmonic generator, and detecting said modulated signals to determine the movement of said harmonic generator.

References Cited

UNITED STATES PATENTS

| | | | |
|---|---|---|---|
| 2,460,781 | 2/1949 | Cantelo | 325—17 |
| 3,108,275 | 10/1963 | Chisholm | 325—8 |
| 2,607,004 | 8/1952 | Harris | 325—8 |
| 3,117,277 | 1/1964 | Magondeaux | 325—8 |
| 3,183,441 | 5/1965 | Francis et al. | 325—8 |
| 3,368,150 | 2/1968 | Worcester | 325—357 |
| 3,390,333 | 6/1968 | Klawsnik et al. | 325—14 |

RICHARD MURRAY, Primary Examiner

A. J. MAYER, Assistant Examiner

U.S. Cl. X.R.

325—15